(12) United States Patent
Onstenk et al.

(10) Patent No.: US 6,817,374 B2
(45) Date of Patent: Nov. 16, 2004

(54) CHECK VALVE

(75) Inventors: David Onstenk, Granite Bay, CA (US); Erik E. Erlandson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/674,473

(22) Filed: Sep. 29, 2003

(65) Prior Publication Data

US 2004/0060593 A1 Apr. 1, 2004

Related U.S. Application Data

(63) Continuation of application No. 10/094,527, filed on Mar. 8, 2002, now Pat. No. 6,668,849.

(51) Int. Cl.[7] .............................. F16K 15/14; H05K 7/20
(52) U.S. Cl. ....................... 137/1; 137/512.15; 251/902; 361/695; 454/184
(58) Field of Search ................................ 137/1, 512.15, 137/533.27; 251/902; 361/687, 688, 689, 690, 691, 692, 693, 694, 695; 454/184

(56) References Cited

U.S. PATENT DOCUMENTS

| | | | |
|---|---|---|---|
| 2,249,971 A | 7/1941 | Mecorney | |
| 3,063,461 A | * 11/1962 | Hans | ............ 137/102 |
| 3,307,819 A | 3/1967 | Cocito | |
| 3,788,071 A | 1/1974 | Brewer | |
| 4,045,009 A | 8/1977 | Pees | |
| 4,574,835 A | 3/1986 | Williams | |
| 5,301,504 A | * 4/1994 | Bertling et al. | ............ 60/307 |
| 5,601,112 A | 2/1997 | Sekiya et al. | |
| 5,727,594 A | 3/1998 | Choksi | |
| 5,890,959 A | 4/1999 | Pettit et al. | |
| 6,031,717 A | 2/2000 | Baddour et al. | |
| 6,135,875 A | 10/2000 | French | |
| 6,174,232 B1 | 1/2001 | Stoll et al. | |
| 6,240,962 B1 | 6/2001 | Tai et al. | |
| 6,554,698 B2 | 4/2003 | Kranzdorf et al. | |
| 6,587,340 B2 | 7/2003 | Grouell et al. | |

* cited by examiner

Primary Examiner—Ramesh Krishnamurthy

(57) ABSTRACT

In one embodiment, a check valve includes an outer region and a central region. One or more cuts wind from the outer region towards the central region. In the presence of flow along one direction, the check valve opens by extending the central region away from the outer region. In the presence of flow in the reverse direction, the check valve closes by retracting the central region towards the outer region.

40 Claims, 10 Drawing Sheets

SECTION A-A

SECTION A-A

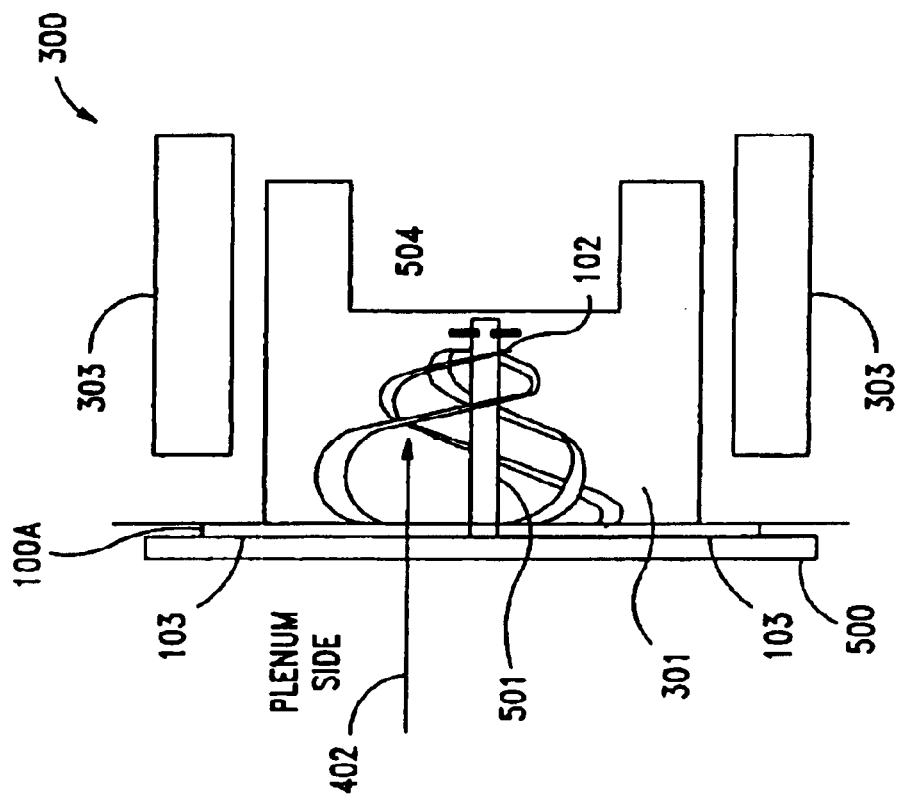
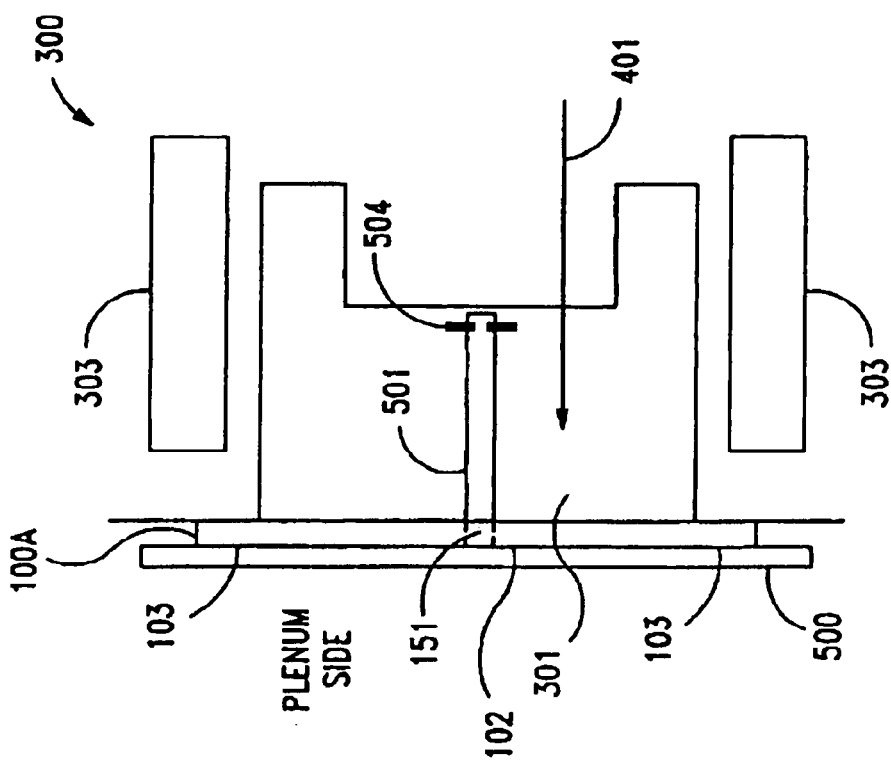
FIG. 5C
FIG. 5D

CHECK VALVE

CROSS-REFERENCE TO RELATED APPLICATION

This application is a continuation of patent application having Ser. No. 10/094,527, filed Mar. 8, 2002, now U.S. Pat. No. 6,668,849, which is hereby fully incorporated herein by reference. Benefit of all earlier filing dates is claimed for all common subject matter.

BACKGROUND OF THE INVENTION

1. Field of the Invention

The present invention relates generally to valves, and more particularly but not exclusively to check valves for cooling mechanisms.

2. Description of the Background Art

Enclosures for housing electronic circuits typically include one or more cooling mechanisms to maintain the circuits at an acceptable operating temperature. In the case of mission-critical equipment, such as a data center network switch or enterprise computer system, the cooling mechanism advantageously includes redundant components so that the equipment does not overheat even if one of its cooling components fail. For example, some equipment designs include multiple axial fans and/or blowers (hereafter referred to as fans when referring to both types) to ensure that there are a sufficient number of remaining functional fans in the enclosure to provide cooling in the event that one of the fans fail.

A cooling mechanism with multiple fans typically includes a plenum arrangement through which the fans draw air through the equipment. When one of the fans fail, reverse airflow through the failing fan results in a reduction of airflow through the plenum, thereby increasing the operating temperature of the equipment. This condition may lead to overheating.

As is well known, a check valve limits flow in one direction. Check valves have been employed to help minimize the negative impact of a failed fan in a plenum arrangement having multiple fans. However, these check valves are typically designed to work only on the exhaust side of an axial fan, occupy significant space outside the fan during normal operation, or can usually only be used with an axial fan. For example, because of their design, some of these check valves are not suitable for use with blowers.

SUMMARY

The present invention relates to check valves. In one embodiment, a check valve includes an outer region and a central region. One or more cuts wind from the outer region towards the central region. In the presence of flow along one direction, the check valve opens by extending the central region away from the outer region. In the presence of flow in the reverse direction, the check valve closes by retracting the central region towards the outer region.

These and other features and advantages of the present invention will be readily apparent to persons of ordinary skill in the art upon reading the entirety of this disclosure, which includes the accompanying drawings and claims.

DESCRIPTION OF THE DRAWINGS

FIGS. 5A–5D show various views illustrating the use of another check valve with a blower and a grate in accordance with an embodiment of the present invention.

The use of the same reference label in different drawings indicates the same or like components. Additionally, drawings are not to scale unless otherwise noted.

DETAILED DESCRIPTION

In the present disclosure, numerous specific details are provided, such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention will be described in the context of controlling airflow. It should be understood, however, that the invention may also be used to control fluid flow or mixed-phase flow. For example, the invention may be employed as a check valve in automotive devices, artificial hearts, etc.

Figure 1A:
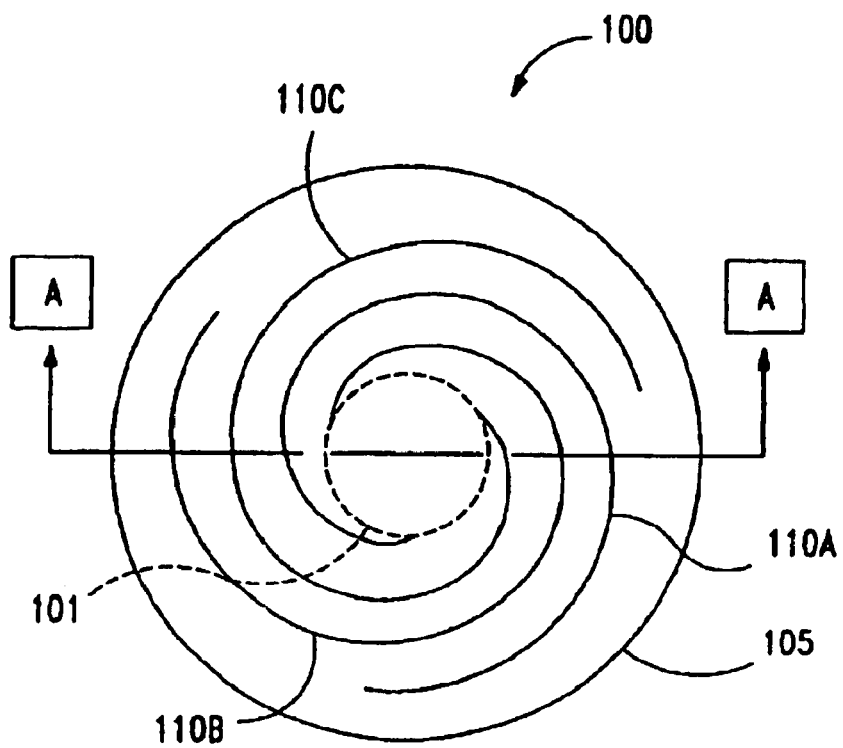
FIGS. 1A–1D show various views of a check valve in accordance with an embodiment of the present invention.

Referring now to FIG. 1A, there is shown a check valve 100 in accordance with an embodiment of the present invention. Check valve 100 includes an outer region near perimeter 105 and a central region near the center of the check valve. The central region is depicted in FIG. 1A as being a region approximately enclosed by a dashed line 101. The outer region is depicted in FIG. 1A as being a region between dashed line 101 and perimeter 105, typically near perimeter 105. As shown in FIG. 1A, one or more cuts 110 (i.e., 100A, 110B, ... ) wind from the outer region towards the central region in a continuous pattern. A cut 110 does not have be a cut in a single piece of material; a cut 110 may be a continuous cut in an assembly, for example. Additionally, a cut 110 is not necessarily made by "cutting"; as will be explained later on below, a cut 110 may be made using interfering laminated material, for example.

Figure 1B:
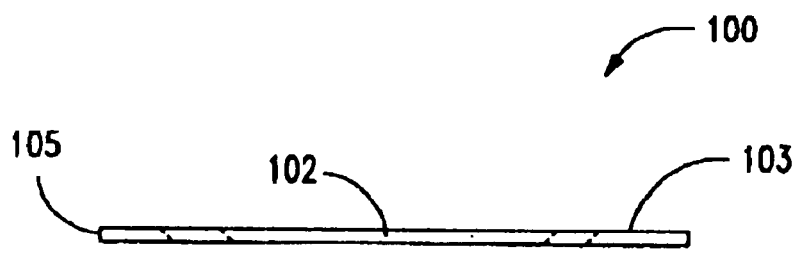

FIG. 1B shows a side cross-sectional view of check valve 100 taken at section A—A of FIG. 1A. FIG. 1B depicts check valve 100 in its closed position. That is, FIG. 1B depicts check valve 100 when it is fully collapsed. For illustration purposes, the central region is generally labeled as central region 102 in FIGS. 1B and 1C, while the outer region is generally labeled as outer region 103.

Figure 1C:
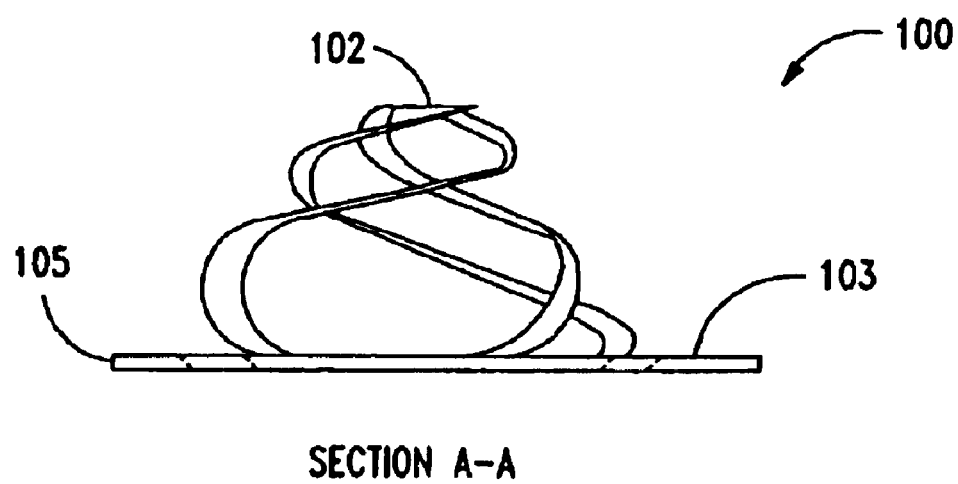

FIG. 1C shows another side view of check valve 100. FIG. 1C depicts check valve 100 in its open position. Check valve 100 is open when it is expanded. To open check valve 100, central region 102 may be extended away from outer region 103. Central region 102 may twist a few degrees as it extends away from outer region 103. The resulting gaps through cuts 110 allow air to flow through check valve 100.

Note that check valve 100 may be opened or closed by moving either outer region 103, central region 102, or both.

For example, check valve 100 may be opened by moving outer region 103 away from central region 102. Similarly, check valve 100 may be closed by moving outer region 103 towards central region 102. Thus, depending on the application, extending or retracting central region 102 may involve movement of central region 102, outer region 103, or both.

Figure 1D:
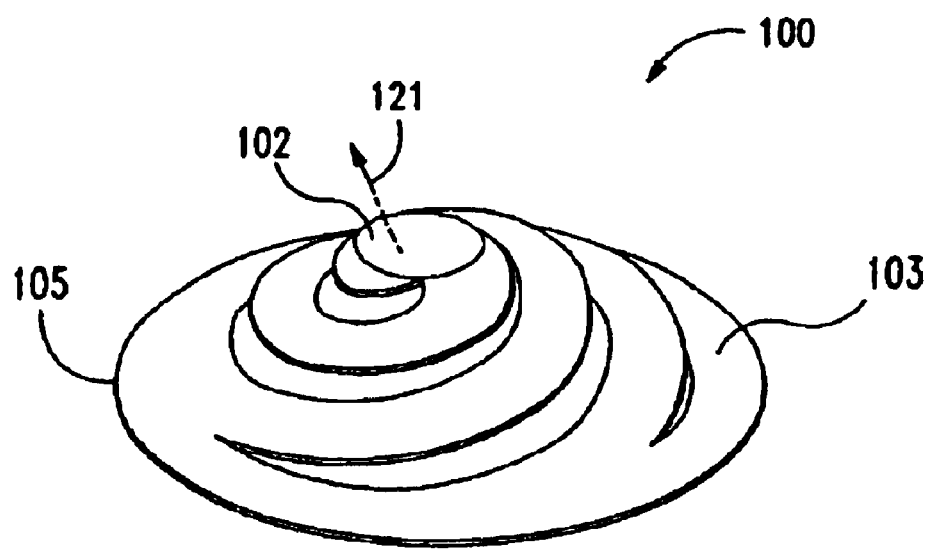

FIG. 1D shows a perspective view of check valve 100 in an open position. When open, check valve 100 allows air to flow in a direction indicated by arrow 121. Airflow in the opposite direction causes central region 102 to retract towards outer region 103, thereby closing check valve 100 and limiting reverse airflow.

Check valve 100 may be made of flexible material such as, for example, plastic membrane. Check valve 100 may be made of material with low coefficient of friction to help minimize damage to adjacent components that may be contacted by a moving portion of check valve 100. For example, check valve 100 may be made of a Teflon® coated material.

Figure 2A:
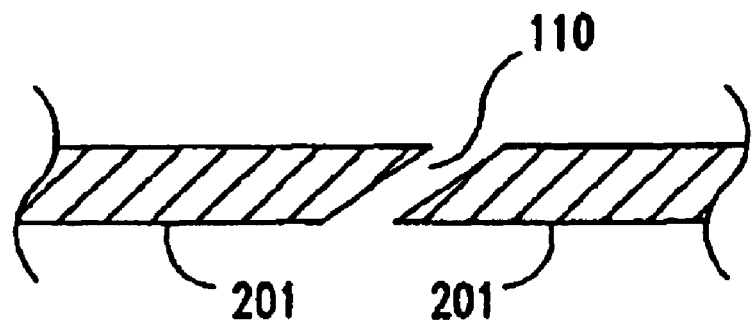
FIG. 2A shows a side cross-sectional view illustrating a cut, formed by cutting a check valve material at an angle in accordance with an embodiment of the present invention.

Various techniques may be employed to prevent central region 102 from retracting past outer region 103 when check valve 100 closes. For example, a cut 110 may be made by cutting the check valve material at an angle so as to create a bevel on the edges of the cut. This allows central region 102 to be extended in one direction when check valve 100 is open. However, the bevels would interfere and seat against each other when check valve 100 is closed, thus preventing central region 102 from extending in the other, opposite direction. FIG. 2A shows a side cross-sectional view illustrating a cut 110 formed by cutting material 201 of check valve 100 at an angle.

Figure 2B:
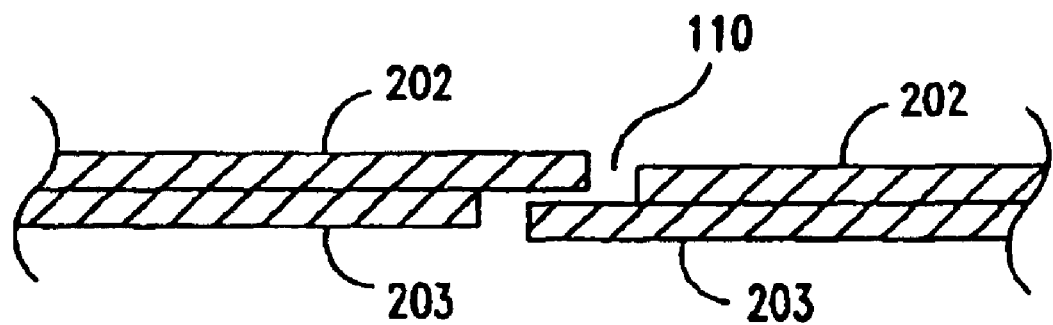
FIG. 2B shows a side cross-sectional view illustrating a cut formed by using a laminated check valve material in accordance with an embodiment of the present invention.

FIG. 2B shows a side cross-sectional view illustrating a cut 110 formed using laminated check valve material. In FIG. 2B, the check valve material is made of a layer 202 and a layer 203. As shown in FIG. 2B, a portion of layer 203 on one side of cut 110 interferes with a portion of layer 202 on the other side of the cut, thus allowing extension in only one direction.

Other techniques for preventing the central region from retracting past the outer region when the check valve is closed may also be employed without detracting from the merits of the present invention. For example, the check valve does not necessarily have to be flat when in the closed position; cuts may be made such that each resulting strip overlaps with the previous strip, etc.

The specific geometry of check valve 100 may be varied to suit specific applications. For example, cuts 110 may be limited to the vicinity of outer region 103 so that central region 102 would provide more surface area. This would facilitate the pulling of check valve 100 into its open position with a reduced pressure differential. Check valve 100 may also have a shape other than round. For example, check valve 100 may have a rectangular or oblong shape. As another example, check valve 100 may have a geometric shape such that it forms a domed, conical or dish-like shape. The arch formed by a dish-like shape may be beneficial in preventing breech or collapse of the check valve in applications involving high pressures.

Figure 3A:
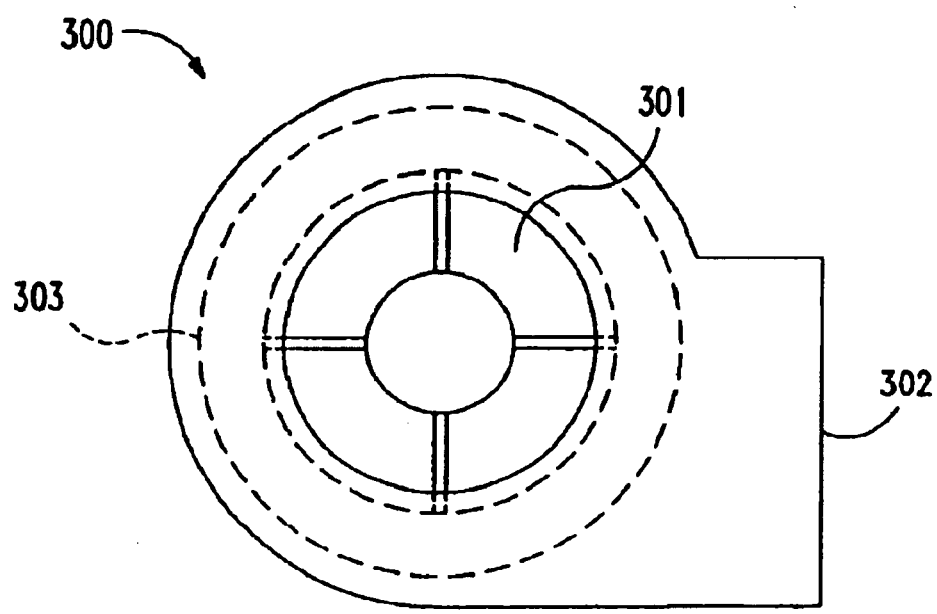
FIGS. 3A and 3B show a side view and a front view, respectively, of a ducted blower that may benefit from embodiments of the present invention.
Figure 3B:
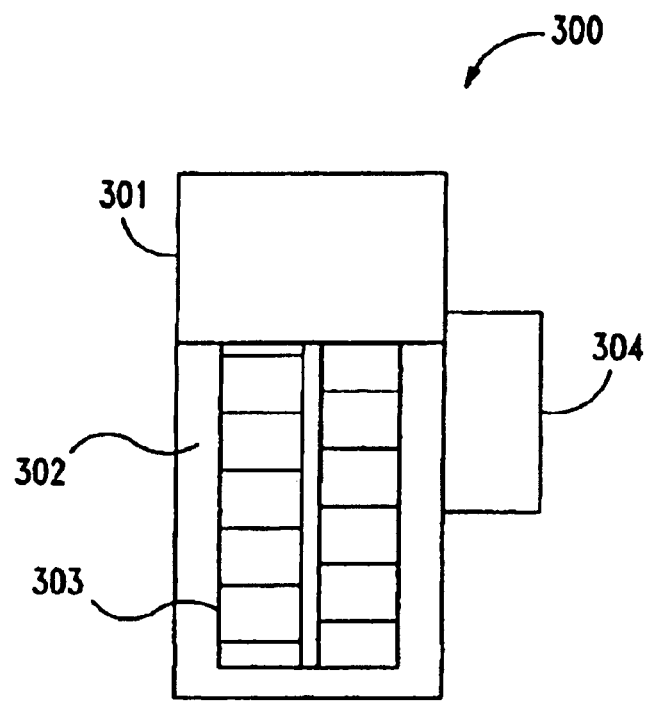

FIGS. 3A and 3B show a side view and a front view, respectively, of a blower 300 that may benefit from embodiments of the present invention. Blower 300, also referred to as a "squirrel cage", has an intake side 301 and an exhaust 302. A motor 304 rotates wheel 303 to move air from intake side 301 to exhaust 302. Intake side 301 draws air from the interior of an enclosure, while exhaust 302 exhausts air out of the enclosure. Rotating wheel 303 will thus draw air through the enclosure.

It is to be noted that blower 300 draws air in one direction and exhausts the drawn air in another direction. That is, a blower intake forms a significant angle with the exhaust. In contrast, an axial-type fan draws and exhausts air along more of an axial direction. Because of this difference, check valves designed for axial fans may not be suitable for blowers. For example, check-valves with multiple flaps arranged around an outer region will not work well with blower 300 because the flaps will significantly block the air path to wheel 303 when the check valve is installed on the intake side.

Figure 4A:
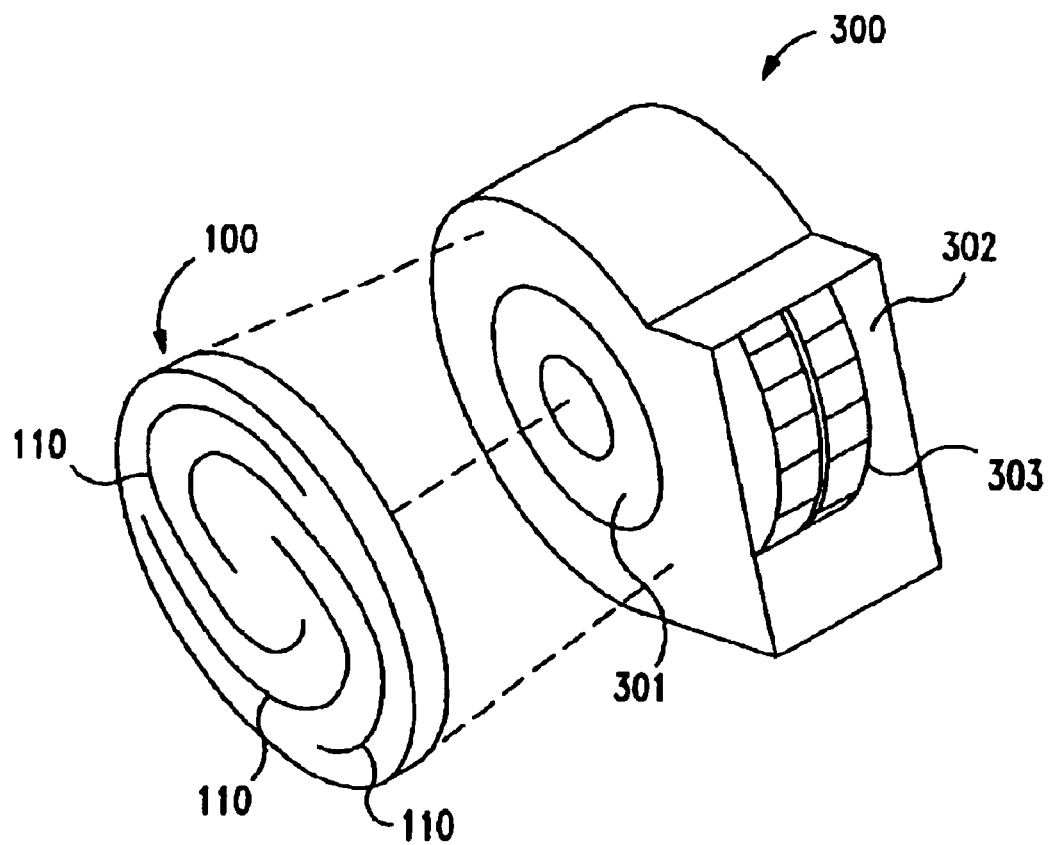
FIGS. 4A–4C show various views illustrating the use of a check valve with a blower in accordance with an embodiment of the present invention.

FIG. 4A shows a perspective view illustrating the use of check valve 100 with blower 300 in accordance with an embodiment of the present invention. It should be understood, however, that embodiments of the present invention may be used with other types of fans, pumps or blowers. Embodiments of the present invention may also be used independently. Check valve 100 may be attached to a portion of an enclosure when employed with a non-ducted blower. Embodiments of the present invention may also be used with axial fans. Additionally, embodiments of the present invention may be installed on either the intake or exhaust depending on the application.

In the example of FIG. 4A, check valve 100 is attached on intake side 301 of blower 300. Check valve 100 may be attached to blower 300 using a variety of fastening means including bolts, adhesives, screws, rivets, etc. Advantageously, check valve 100 is attached such that cuts 110 wind in the direction wheel 303 rotates to facilitate air flow and to reduce turbulence.

In the example of FIG. 4A, intake side 301 of blower 300 faces a plenum. It is to be noted that the term "plenum" is used in the present disclosure to refer to a structure (e.g., enclosure, cabinet, chassis) in which air is at a pressure less than or greater than that outside the structure during normal operation. A plenum does not necessarily require ducting. An example plenum arrangement is an enclosure containing multiple fans with parallel flow.

Figure 4C:
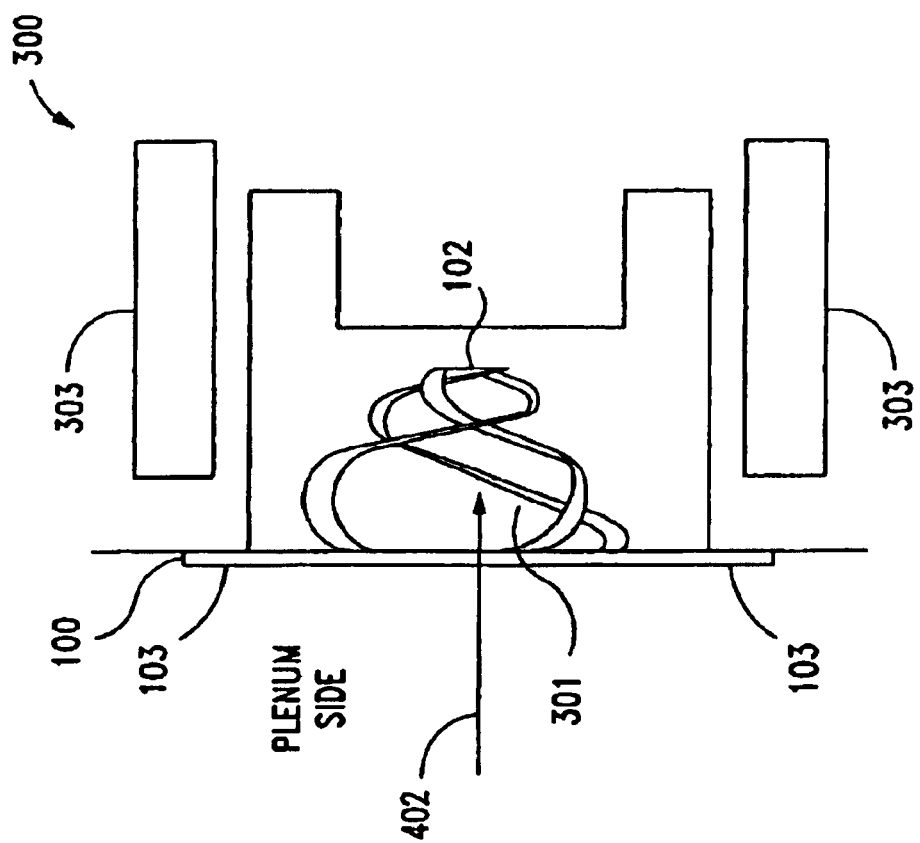
Figure 4B:
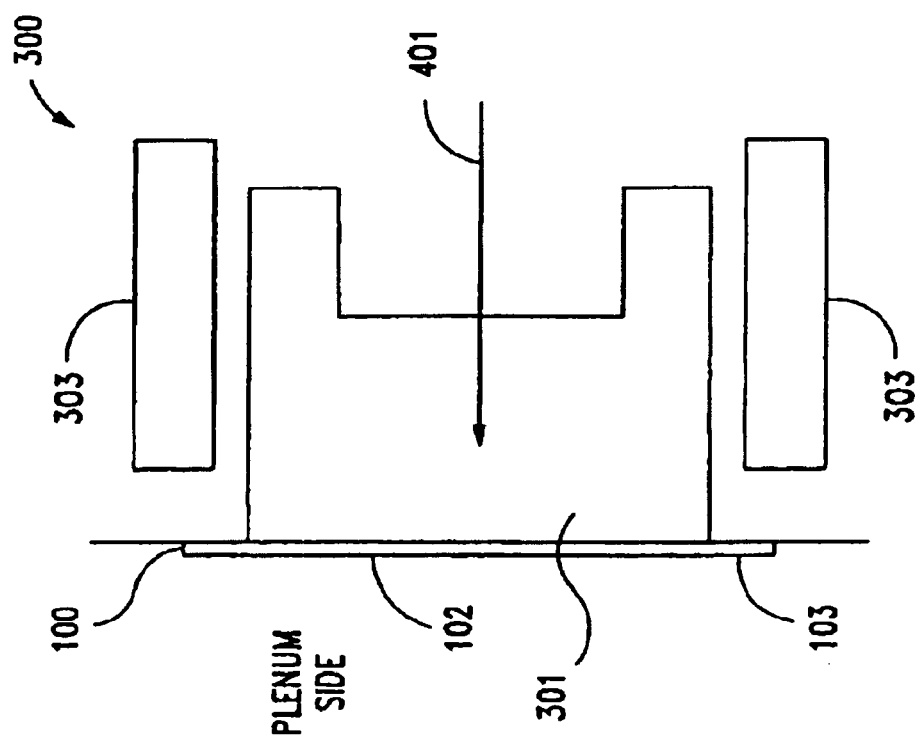

FIG. 4B shows a side cross-sectional view of blower 300 with a check valve 100 attached on intake side 301. FIG. 4B depicts check valve 100 in its closed position. Check valve 100 limits airflow in the direction indicated by arrow 401. As can be appreciated, this helps maintain total airflow through the plenum in the event blower 300 fails (e.g., wheel 303 stops rotating or slows down). In the example of FIG. 4B, check valve 100 closes by retracting its central region 102 towards its outer region 103.

FIG. 4C shows a side cross-sectional view of blower 300 with an open check valve 100 attached on intake side 301. When blower 300 is operating, vacuum created in the center of wheel 303 creates a pressure difference across the surfaces of check valve 100, thereby extending the central region 102 of check valve 100 towards the center of wheel 303. As check valve 100 expands, it opens to allow air to flow through check valve 100 in the direction indicated by arrow 402; the drawn air flows out to exhausts 302 (not shown in FIG. 4C; see FIG. 4A). In the example of FIG. 4C, check valve 100 opens by extending central region 102 away from outer region 103.

Because check valve 100 opens into blower 300, it does not require additional space outside of blower 300 when in the open position. This advantageously allows check valve 100 to be used in applications where space is limited.

Figure 5A:
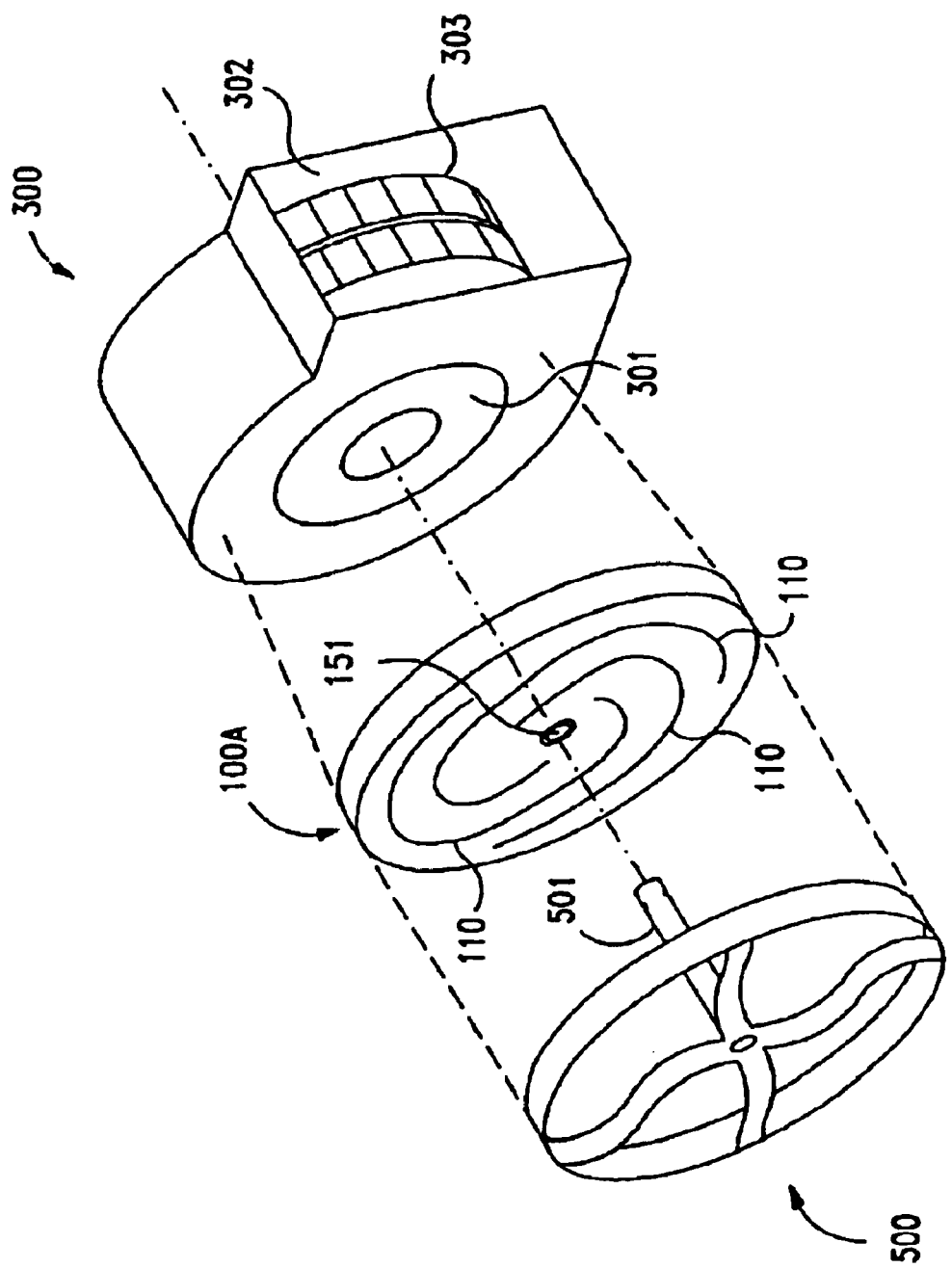

FIG. 5A shows a perspective view illustrating the use of a check valve 100A with blower 300 and a grate 500 in accordance with an embodiment of the present invention. Check valve 100A is a specific embodiment of check valve 100 shown in FIGS. 1A–1D. Check valve 100A is similar to check valve 100 except for the addition of a hole 151. Hole 151 allows the central portion of check valve 100A to slide on a shaft 501, thereby controlling vibration and movement as check valve 100A opens. Hole 151 may include a collet or collar, for example. Hole 151 is sized to allow for rotation of check valve 100A when it expands to the open position.

As shown in FIG. 5A, check valve 100A may be used with grate 500. Grate 500 includes shaft 501, which goes through hole 151 of check valve 100A. In the example of FIG. 5A, check valve 100A is attached on intake side 301 of blower 300, while grate 500 is attached over check valve 100A. Check valve 100A and grate 500 may be attached using a variety of fastening means including bolts, adhesives, screws, rivets, etc. Advantageously, check valve 100A is attached such that cuts 110 wind in the direction wheel 303 rotates.

Figure 5B:
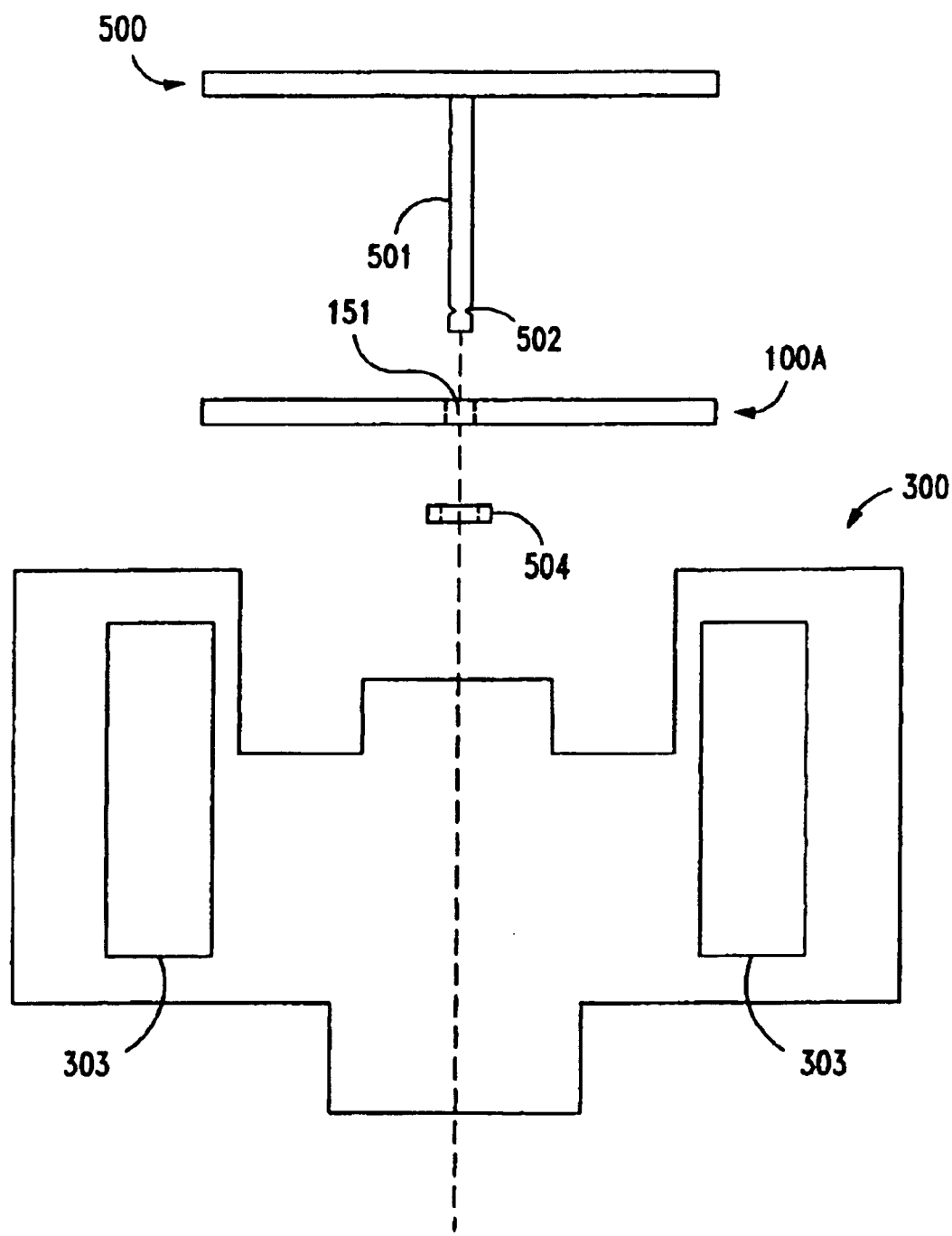

FIG. 5B shows a side view further illustrating the arrangement of grate 500, check valve 100A, and blower 300. As shown in FIG. 5B, shaft 501 may include a hard stop 502 for physically limiting the expansion of check valve 100A. For example, hard stop 502 may be a groove over which a locking mechanism 504 (e.g., locking star washer) may be pressed after shaft 501 is inserted through hole 151. It is to be noted that other means for physically limiting movement of a sliding component may also be used.

FIG. 5C shows a side cross-sectional view of blower 300 with check valve 100A and grate 500 attached on intake side 301. FIG. 5C depicts check valve 100A in its closed position. In the example of FIG. 5C, check valve 100A closes by retracting its central region towards its outer region. When closed, check valve 100A prevents airflow in the direction indicated by arrow 401. As can be appreciated, this helps limit reverse airflow in the plenum in the event blower 300 fails (e.g., wheel 303 stops rotating or slows down). FIG. 5C also shows a locking mechanism 504 on shaft 501.

FIG. 5D shows a side cross-sectional view of blower 300, grate 500, and an open check valve 100A. When blower 300 is operating, vacuum created in the center of wheel 303 pulls on check valve 100A, thereby expanding check valve 100A towards the center of wheel 303. Locking mechanism 504 arrests the movement of central region 102 so that it does not bump into wheel 303 or motor 304. As check valve 100A expands, it opens to allow air to flow through check valve 100A in the direction indicated by arrow 402; the drawn air flows out to exhausts 302 (not shown in FIG. 5D; see FIG. 5A). In the example of FIG. 5D, check valve 100A opens by extending central region 102 away from outer region 103.

The outer perimeter of grate 500 may be open to allow airflow within the height of grate 500. This helps allow additional airflow in applications where part of the enclosure, or other object, is close to or in contact with the top of grate 500.

As can be appreciated, the present invention is not limited to the above-disclosed embodiments. For example, hole 151 may include a position encoder so that the position of check valve 100A may be monitored. As another example, the central portion of check valve 100A may be fixedly attached to the end of a slide-able shaft 501 so that shaft 501 may be manually actuated (like a plunger) to open and close check valve 100A.

Figure 6:
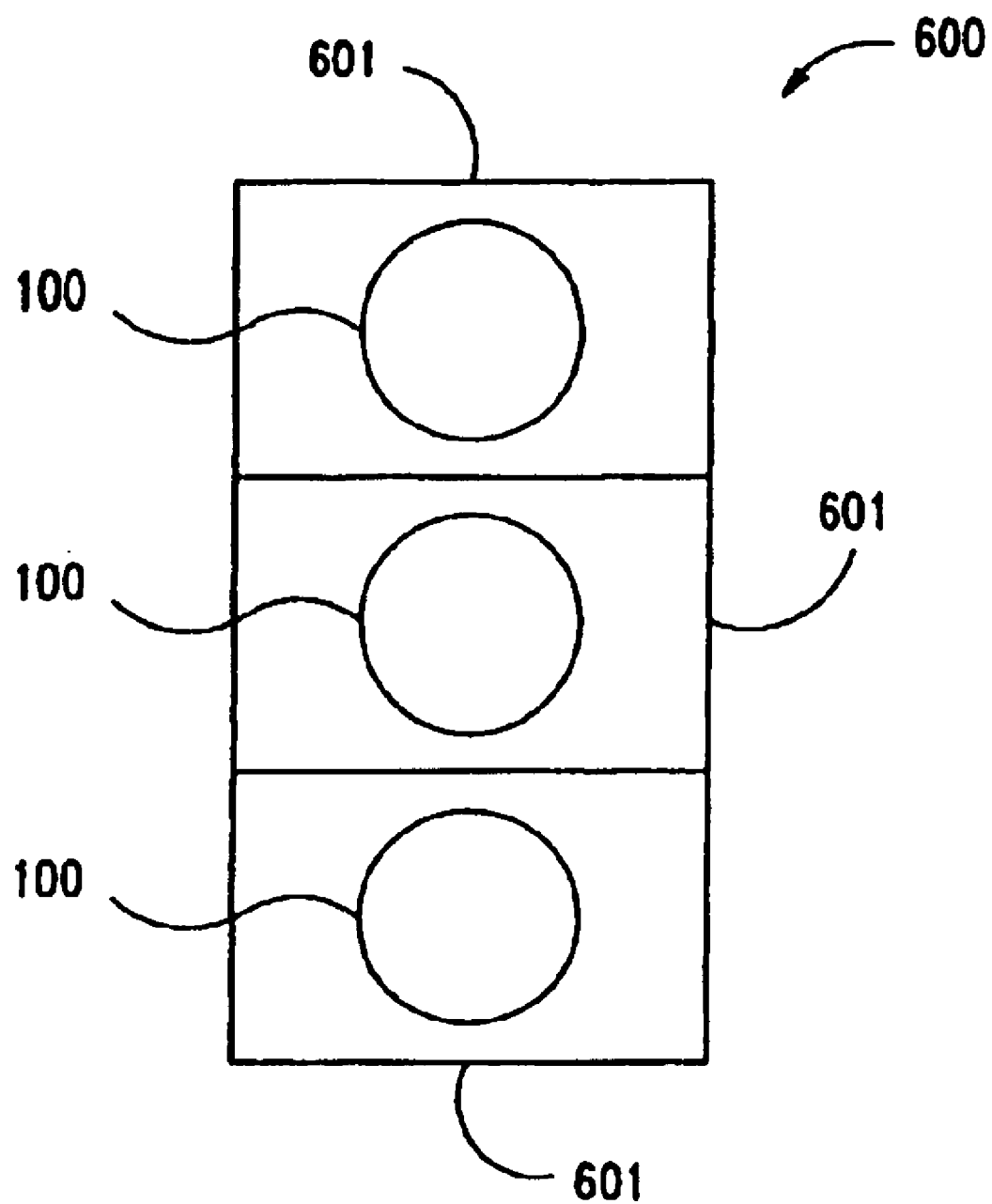
FIG. 6 shows a schematic diagram of a cooling mechanism in accordance with an embodiment of the present invention.

FIG. 6 shows a schematic diagram of a cooling mechanism 600 in accordance with an embodiment of the present invention. Cooling mechanism 600 includes an array of cooling components 601, each with a corresponding check valve 100. Cooling components 601 may be stacked in a single column as shown in FIG. 6 or arranged in a two dimensional array. Cooling components 601 may be, for example, blowers or axial fans. Cooling mechanism 600 may be employed in equipment requiring redundant cooling components. As can be appreciated, the use of a check valve 100 in cooling mechanism 600 minimizes the adverse effect of a failing cooling component 601 by limiting reverse airflow through the cooling component.

An improved check valve has been disclosed. While specific embodiments have been provided, these embodiments are provided for illustration purposes only and not limiting. Many additional embodiments will be apparent to persons of ordinary skill in the art reading this disclosure. Thus, the present invention is limited only by the following claims.

What is claimed is:

1. A check valve comprising:
   an outer region;
   a central region;
   a cut winding from the outer region towards the central region; and wherein the check valve opens by extending the central region away from the outer region in the presence of flow along one direction and closes by retracting the central region towards the outer region in the presence of flow in the reverse direction; and wherein the cut includes a bevel on an edge of the cut so that the bevel would interfere with another bevel of another cut of the check valve in order to prevent the central region from extending past the outer region in the direction of the flow in the reverse direction.

2. The check valve of claim 1 wherein the check valve opens by moving the central region towards a fan.

3. The check valve of claim 1 wherein the check valve is on an intake side of a blower.

4. The check valve of claim 1 wherein the check valve is on a blower.

5. The check valve of claim 1 wherein the central region further includes a hole sliding on a shaft.

6. The check valve of claim 5 wherein the shaft is fixedly attached to a grate.

7. The check valve of claim 5 wherein the shaft includes a hard stop for arresting movement of the central region.

8. The check valve of claim 1 wherein the check valve has a circular shape.

9. The check valve of claim 1, wherein the cut winding forms a plurality of gaps between the cut winding when the central region is extended away from the outer region, and wherein the central region is extended in the direction of the flow along the one direction.

10. The check valve of claim 1, wherein the cut winding closes a plurality of gaps between the cut winding when the central region is retracted towards the outer region, and wherein the central region is retracted in the direction of the flow in the reverse direction.

11. The check valve of claim 1, wherein the cut comprises an interfering laminated material.

12. The check valve of claim 1, wherein the central region may twist a few degrees as the central region extends away from the outer region.

13. The check valve of claim 1, wherein the bevel and the another bevel would interfere and seat against each other when the check valve closes by retracting the central region towards the outer region in the presence of flow in the reverse direction.

14. A method of preventing reverse air flow through a fan, the method comprising:

expanding a check valve towards a center of a working blower to allow airflow through the check valve; and when the fan fails, collapsing the check valve to limit airflow through the check valve; wherein the check valve includes a cut with a bevel on an edge of the cut.

15. The method of claim 14 wherein the check valve includes one or more cuts winding from an outer region towards a central region.

16. The method of claim 14 wherein expanding the check valve includes sliding a central portion of the check valve.

17. The method of claim 14 wherein closing the check valve includes retracting a central portion of the check valve.

18. A check valve comprising:

means for expanding a check valve towards the center of a blower to allow airflow in one direction; and means for collapsing the check valve to limit airflow in the reverse direction; wherein the check valve includes a cut with a bevel on an edge of the cut.

19. The check value of claim 18 further comprising:

means for controlling expansion of the check valve.

20. A cooling mechanism comprising:

a plurality of cooling components, each cooling component in the plurality of cooling components having a check valve that includes a cut winding from an outer region towards a central region; and wherein the check valve in each cooling component opens by extending the central region away from the outer region in the presence of flow along one direction and closes by retracting the central region towards the outer region in the presence of flow in the reverse direction; and wherein the cut includes a bevel on an edge of the cut so that the bevel would interfere with another bevel of another cut of the check valve in order to prevent the central region from extending past the outer region in the direction of the flow in the reverse direction.

21. The cooling mechanism of claim 20 wherein the plurality of cooling components includes a blower.

22. The cooling mechanism of claim 20 wherein the plurality of cooling components includes an axial fan.

23. A method of preventing reverse air flow, the method comprising:

opening a check valve by extending a central region of the check valve away from an outer region of the check valve, in the presence of flow along one direction; and closing the check valve by retracting the central region towards the outer region in the presence of flow in a reverse direction; and wherein the check valve includes a cut with a bevel on an edge of the cut.

24. The method of claim 23 wherein the check valve opens by moving the central region towards a fan.

25. The method of claim 23 wherein the check valve is on an intake side of a blower.

26. The method of claim 23 wherein the check valve is on a blower.

27. The method of claim 23 wherein the central region further includes a hole sliding on a shaft.

28. The method of claim 27 wherein the shaft is fixedly attached to a grate.

29. The method of claim 27 wherein the shaft includes a hard stop for arresting movement of the central region.

30. The method of claim 27 wherein the check valve has a circular shape.

31. The method of claim 23, wherein the cut winding forms a plurality of gaps between the cut winding when the central region is extended away from the outer region, and wherein the central region is extended in the direction of the flow along the one direction.

32. The method of claim 23, wherein the cut winding closes a plurality of gaps between the cut winding when the central region is retracted towards the outer region, and wherein the central region is retracted in the direction of the flow in the reverse direction.

33. A check valve comprising:

an outer region;

a central region;

a cut winding from the outer region towards the central region; and wherein the check valve opens by extending the central region away from the outer region in the presence of flow along one direction and closes by retracting the central region towards the outer region in the presence of flow in the reverse direction; and wherein the cut comprises a first layer and a second layer, and wherein a portion of the first layer on one side of the cut is configured to interfere with a portion of the second layer on the other side of the cut, in order to prevent the central region from extending past the outer region in the direction of the flow in the reverse direction.

34. The check valve of claim 33 wherein the check valve opens by moving the central region towards a fan.

35. The check valve of claim 33 wherein the check valve is on an intake side of a blower.

36. The check valve of claim 33 wherein the check valve is on a blower.

37. The check valve of claim 33 wherein the central region further includes a hole sliding on a shaft.

38. The check valve of claim 37 wherein the shaft is fixedly attached to a grate.

39. The check valve of claim 37 wherein the shaft includes a hard stop for arresting movement of the central region.

40. The check valve of claim 33 wherein the check valve has a circular shape.

* * * * *